US012357953B1

(12) United States Patent
DiBernardo et al.

(10) Patent No.: US 12,357,953 B1
(45) Date of Patent: Jul. 15, 2025

(54) BATCHING METHOD AND SYSTEM

(71) Applicant: INITECH INC., Clifton, NJ (US)

(72) Inventors: Richard DiBernardo, Pearl River, NY (US); Trevor B. Mastorio, Parlin, NJ (US); Raymond Schleckser, Jr., Jackson, NJ (US); William A. Simpson, Harleysville, PA (US); Matthew C. Tucker, Oradell, NJ (US)

(73) Assignee: INITECH INC., Clifton, NJ (US)

( * ) Notice: Subject to any disclaimer, the term of this patent is extended or adjusted under 35 U.S.C. 154(b) by 0 days.

(21) Appl. No.: 18/797,636

(22) Filed: Aug. 8, 2024

(51) Int. Cl.

| | |
|---|---|
| ***B01F 25/50*** | (2022.01) |
| ***B01F 35/10*** | (2022.01) |
| ***B01F 35/21*** | (2022.01) |
| ***B01F 35/213*** | (2022.01) |
| ***B01F 35/22*** | (2022.01) |
| ***B01F 35/221*** | (2022.01) |

(52) U.S. Cl.
CPC .......... *B01F 25/50* (2022.01); *B01F 35/1452* (2022.01); *B01F 35/21111* (2022.01); *B01F 35/213* (2022.01); *B01F 35/2202* (2022.01); *B01F 35/2218* (2022.01)

(58) Field of Classification Search
CPC .. B01F 25/50; B01F 35/2111; B01F 35/2202; B01F 35/716; B01F 35/714; B01F 33/844
See application file for complete search history.

(56) References Cited

U.S. PATENT DOCUMENTS

| | | | | | |
|---|---|---|---|---|---|
| 3,837,914 | A * | 9/1974 | Cadeo | B01F 25/25 | 127/63 |
| 4,967,938 | A * | 11/1990 | Hellenberg | B01F 35/71805 | 222/14 |
| 6,039,470 | A * | 3/2000 | Conwell | B01F 25/50 | 366/137 |
| 6,368,367 | B1 * | 4/2002 | Langer | B01F 33/811 | 44/302 |
| 8,684,232 | B2 * | 4/2014 | Meeuwisse | B01F 35/88221 | 222/129 |
| 2006/0071018 | A1 * | 4/2006 | Wootton | B01F 25/23 | 222/94 |
| 2009/0312872 | A1 * | 12/2009 | Burris | C10C 3/04 | 700/282 |

(Continued)

FOREIGN PATENT DOCUMENTS

DE 3341674 A1 * 5/1985

*Primary Examiner* — Marc C Howell
(74) *Attorney, Agent, or Firm* — Weitzman Law Offices, LLC

(57) ABSTRACT

A batching system involves a vessel, a mixer, a pump, and an optical sensor, wherein the vessel, the mixer, the pump and the optical sensor are coupled together by piping so as to form a circuit within which materials will re-circulate while being mixed by the mixer until at least one reading from the optical sensor indicates that the materials are fully mixed. An associated batching method involves introducing into a vessel, via gravity feed through mass flow meters, multiple materials to be mixed, repeatedly circulating the materials through a mixer, a pump, a spectroscope and the vessel until a reading from the optical sensor indicates that the multiple materials are fully mixed, and once the multiple materials are fully mixed, dispensing the fully mixed materials into at least one package container using an articulated arm.

19 Claims, 11 Drawing Sheets

(56) References Cited

U.S. PATENT DOCUMENTS

| | | | | |
|---|---|---|---|---|
| 2017/0016926 | A1* | 1/2017 | Aouad | B01F 33/84 |
| 2017/0259229 | A1* | 9/2017 | Chou | B01F 23/49 |
| 2018/0257051 | A1* | 9/2018 | De Haan | B01F 33/844 |
| 2019/0121374 | A1* | 4/2019 | Choubak | B01F 35/2134 |
| 2022/0225747 | A1* | 7/2022 | Brown | A45D 19/00 |

* cited by examiner

FIG. 4C
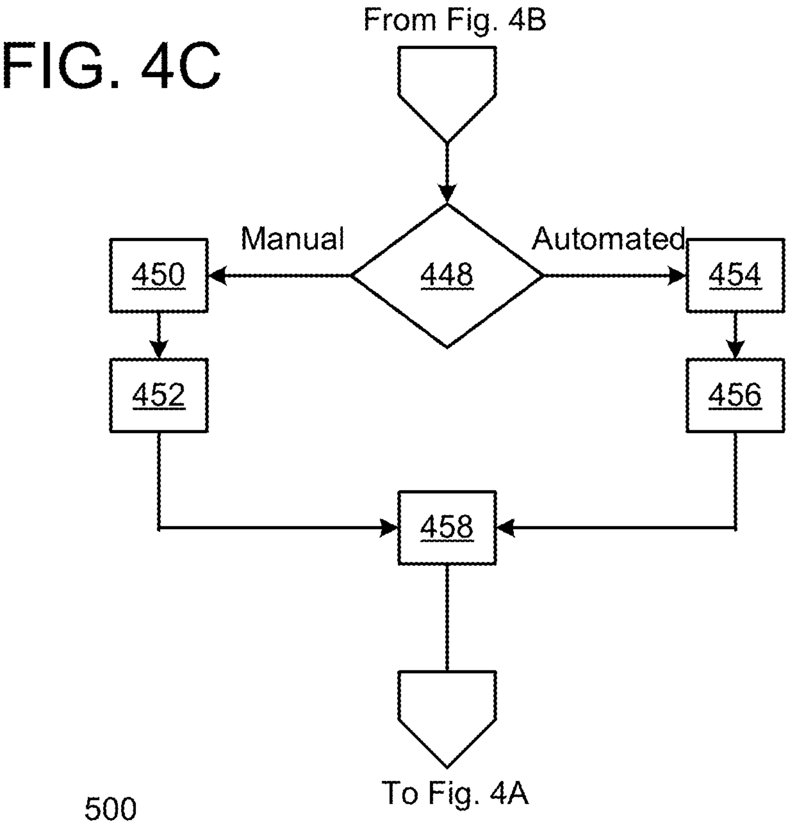
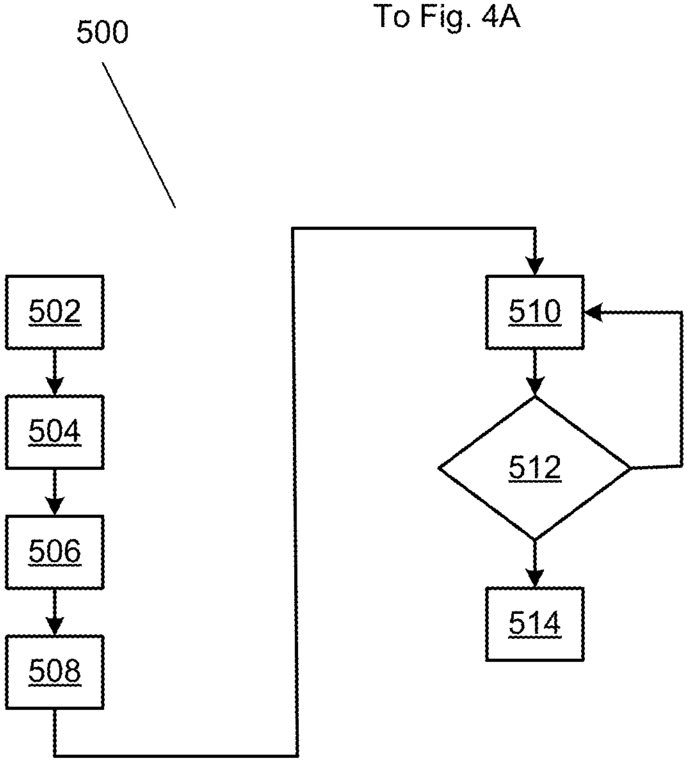
FIG. 5

BATCHING METHOD AND SYSTEM

FIELD OF THE INVENTION

This disclosure relates to ingredient batching technology and, more particularly, to batching technology for mixing solids and/or liquids.

BACKGROUND

Batching is the process of mixing combinations of solids and/or liquids together, into a homogeneous mixture. Common industries where batching is involved include the flavors and fragrances, nutraceutical, beverage, chemical, consumer packaged goods, beauty care, etc. industries. Current common batching practices where more than just a few raw materials are mixed involve large amounts of space. FIG. 1 illustrates, in simplified form, an example portions 100, 110 of a conventional factory containing the equipment used in the flavors and fragrances industry to bath dozens to hundreds or more raw materials together. As shown in FIG. 1, the total floor space taken up by the portions 100, 110 exceeds more than 280 sq. meters (3,000 sq. ft.).

The traditional batching process is "touch" intensive, requiring one or more people to manually spend time moving from station to station to perform various tasks. In one common practice, batches must be staged before being pumped into a large tank for mixing, which requires a compounder to retrieve all the necessary raw materials from various locations around the factory, which takes time. An alternative practice allows the one or more people to bring the tank to the raw materials, but this alternative still requires a lot of movement and use of various different stations, such as a small pours station, a mixing station, a large pours station, and a pack-out station.

Still further, as a touch-intensive process, requiring substantial movement of materials and/or equipment by people, it is subject to human error which can result in substantial waste if an error occurs.

Thus, the current batching process is both space and time-intensive, rendering it costly and inefficient.

SUMMARY

This disclosure describes solutions that provide significant advances in addressing the aforementioned problems.

One aspect of this disclosure involves a batching system including a vessel, a mixer, a pump and an optical sensor. The vessel, the mixer, the pump and the optical sensor are coupled together by piping so as to form a mixing circuit within which materials will re-circulate while being mixed by the mixer until at least one reading from the optical sensor indicates that the materials are fully mixed.

Another aspect of this disclosure involves a batching method. The method involves, introducing into a vessel, via gravity feed through mass flow meters, multiple materials to be mixed, repeatedly circulating the materials through a mixer, a pump, a spectroscope and the vessel until a reading from the optical sensor indicates that the multiple materials are fully mixed, and once the multiple materials are fully mixed, dispensing the fully mixed materials into at least one package container using an articulated arm.

Other aspects, features and advantages will become more fully apparent from the following detailed description, the appended claims, and the accompanying drawings (provided solely for purposes of illustration without restricting the scope of any claim herein or implementation).

BRIEF DESCRIPTION OF THE DRAWINGS

This disclosure is further described in the detailed description that follows, with reference to the drawings, wherein the same reference numbers appearing in the various drawings and description designate corresponding or like elements among the different views. and in which:

FIGS. 4A-4C, collectively, is a flowchart illustrating, in simplified form, the overall process 400 from initial order receipt through packaging for shipment/delivery in accordance with the teachings herein;

FIG. 5 is a flowchart for the of clean-in-place process;

DETAILED DESCRIPTION

Figure 1:
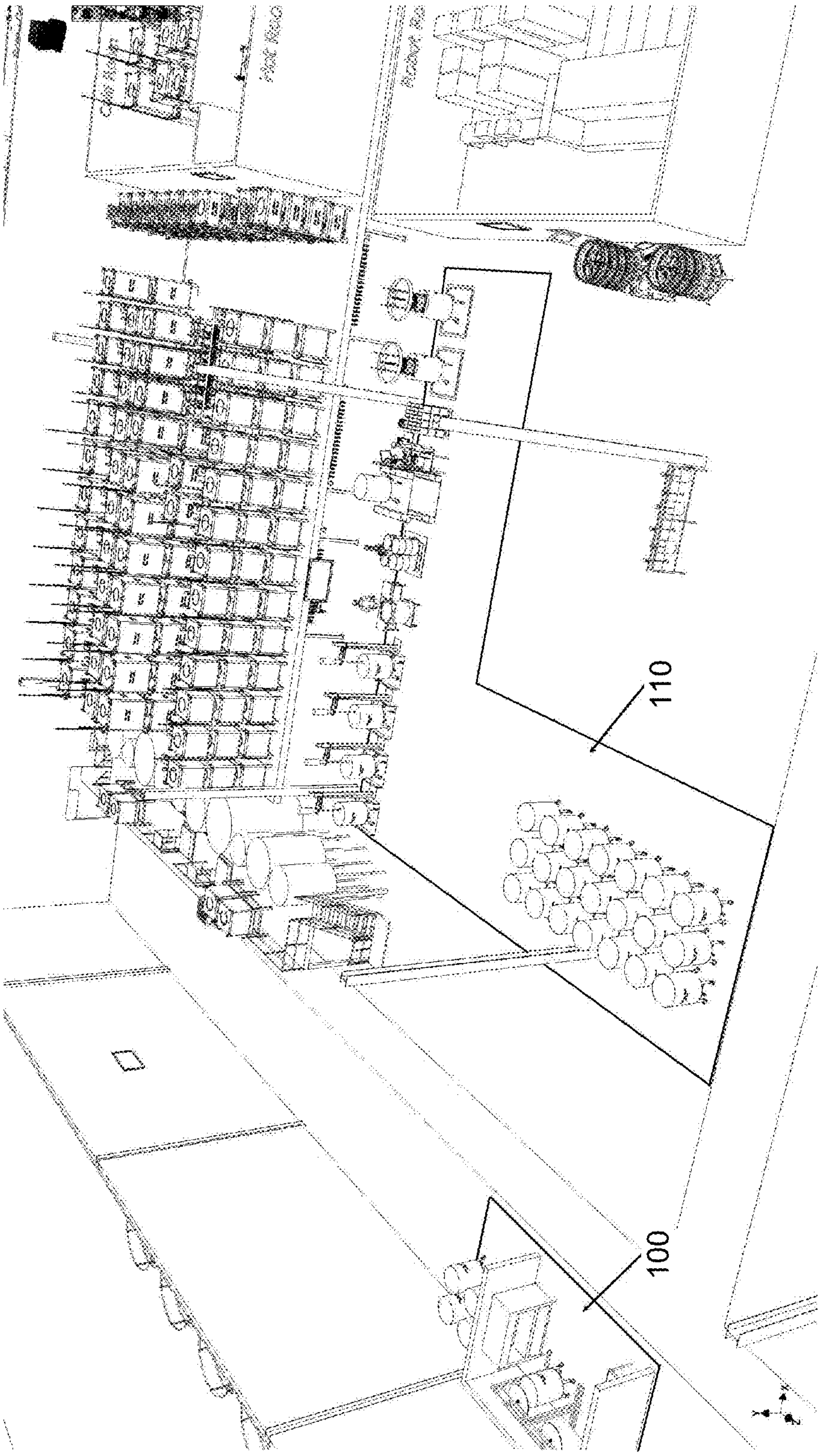
FIG. 1 (Prior Art)
FIG. 1 illustrates, in simplified form, an example of part of a conventional factory having portions containing the equipment, used in the batching industry, to batch dozens of, to hundreds of, or more, raw materials together.

We have developed a system and processes wherein a batching process can occur that requires little to no movement about the factory, can be highly automated (improving efficiency and cost), and requires a fraction of the space conventionally needed in, for example, the portions 110, 110 of the factory of FIG. 1, providing added cost savings.

Still further, variants employing the teachings herein can include a subsystem to implement a clean-in-place process, further improving efficiency and reducing cost.

Figure 2:
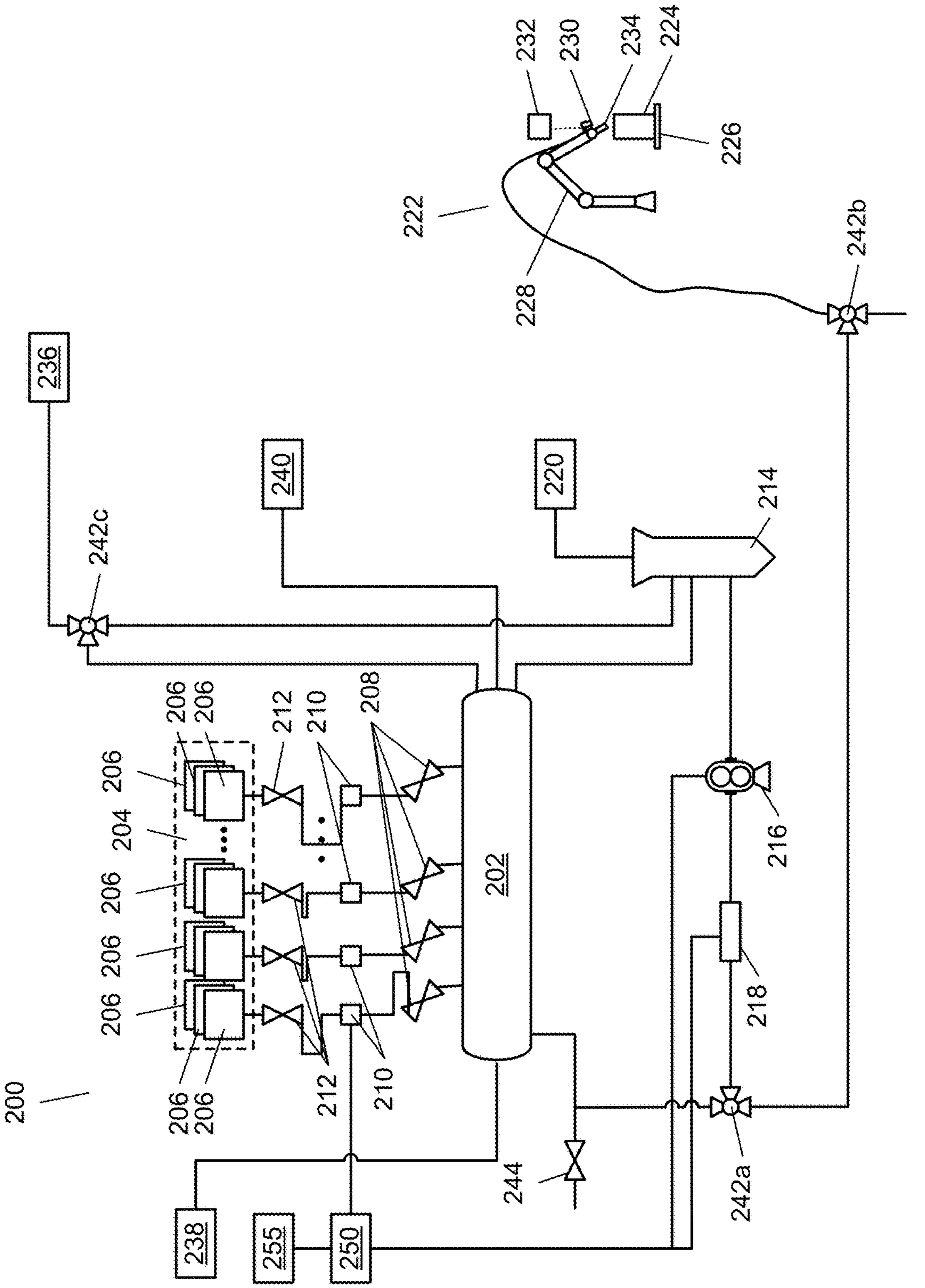
FIG. 2 illustrates, in simplified form, a representative system for batching dozens of, to hundreds of, or more, raw materials together in accordance with the teachings herein.

FIG. 2 illustrates, in simplified form, a representative system 200 for batching dozens of, to hundreds of, or more, raw materials together in accordance with the teachings herein. The system 200 is made up of a vessel 202 coupled to a conventional mezzanine 204 including containers 206 of raw material. commonly referred to as "totes," that can be mixed which, depending upon the particular situation, may be liquids, powers or some combination thereof. In general, the mezzanine 204 may include hundreds or thousands of such containers 206 each with a different raw material therein.

The containers 206 can be coupled to the vessel 202 via automatic valves 208 that are controlled by mass flow meters 210. Optionally, the system may further include one or more additional valves 212 that, of example, allow for changing the container(s) 206 that are connected to the vessel 202.

In addition, as shown in FIG. 2, the vessel 202 is coupled to a mixer 214 which is, in turn, coupled to a pump 216. The pump 216 is coupled back to the vessel 202 via an optical sensor 218. As a result, the vessel 202, mixer 214, pump 216 and optical sensor 218 form a batching or mixing circuit, the operation of which will be described in greater detail below.

In addition, the mixer 214 may include a further manual input station 220 through which material can also be introduced, for example, small pours, manual pours, and/or certain drum or power materials for any of various known reasons.

When a batch is fully mixed, the system 200 is further coupled to a dispensing unit 222, which allows the mixed material to be transferred to one or more conventional containers 224, on a conventional basis, for example, by weight, because the container sits on a scale 226.

Depending upon the particular implementation variant, the dispensing unit 222 may include a manually manipulated articulated arm or the articulated arm may be a robotic arm 228 that optionally further includes, and operates in connection with, a camera 230 under control of a computer 232 implementing machine vision in order to properly orient the output (i.e., dispensing nozzle) 234 relative to an appropriate opening (not shown) of a package container 224 to be filled.

Optionally, the vessel 202 may also be coupled to a clean-in-place supply 236 for purposes of cleaning the vessel 202, and other components and piping through which a mixture may pass so that a new, different batch can be mixed without contamination from a previous batch.

Still further, the vessel may optionally be coupled to a drying air source 238 and exhaust 240, which can ensure proper drying after a clean-in-place operation.

As also shown in FIG. 2, to effect the appropriate connections, the system 200 will also include appropriate piping and may include certain configurations of valves 242*a*-242*c* to appropriately route mixture or cleaning material and/or, optionally, may include one or more valves 244 to, for example, facilitate sampling of the mixture, for example, for quality control purposes.

Finally, some variants may also include an AI system 250, coupled (wired and/or wirelessly) coupled to at least the mass flow meters 210, pump 216 and optical sensor 218, and optionally, also coupled to a conventional Enterprise Resource Planning (ERP) and/or Manufacturing Execution System (MES) 255 (hereafter individually and collectively referred to as "ERP/MES" system 255 for simplicity).

The piping allows the material to be mixed to re-circulate through the system until it is fully mixed, at which point, additional piping can direct the mixed material to pack-out where the piping will connect to a articulated arm. Before the piping returns to the other side of the vessel, there will be a sample valve.

Having described the components of the system 200 in overview, details of the various components will now be described.

The vessel 202 is typically a cylindrical chamber, ideally made of stainless steel, for example 304 or 316 stainless steel. Depending upon the volume of materials likely to be mixed, variants of the vessel 202 can be constructed of different volumes ranging from about a tenth of a cubic meter (about a few hundred gallons) to about 3.8 cubic meters (about a thousand gallons) or more. Optionally, the interior of a given vessel 202 variant may be electropolished to make the vessel 202 easier to clean, increase its longevity, and/or reduce any bacterial adhesion within vessel 202. Optionally, depending upon the particular vessel 202 variant, the vessel 202 can also include at least one access port on, for example, the side or end, to provide for access to the inside of the vessel 202.

As noted above, most materials to be mixed in the system 200 will typically provided from the containers 206 in the mezzanine 204, typically via gravity feed. Optionally, a low-level switch can be located on the bottom of each container 206 and would operate to close an automated valve beneath the container 206 when its contents drop to a certain level to prevent it from fully emptying.

As noted above, each container 206 can be coupled to the vessel 202 through one or more valves 208, 212 and a mass flow meter 210. In general, a valve 212 is interposed between the mass flow meter 210 and a container 206 to act as an isolation valve, for example, to assist with cleaning and/or other maintenance.

The mass flow meter 210 is used to control the automated valve 208 between it and the vessel 202. More particularly, the mass flow meter 210 tracks the material passing to the vessel 202 to ensure the proper amount of material is dispensed. Depending upon the particular implementation, the introduction of different materials into the vessel 202 from the various containers 206 can occur concurrently, in partial overlap or in some form of sequence. The particular mass flow meter 210 used will depend upon, for example, the particular material being dispensed (i.e., liquids, powders, dust, bulk solids, pellets). Suitable examples of mass flow meters that can be used (depending upon the material involved) include the QuantiMass Mass Flow Measurement Sensor/Meter, available from Monitor Technologies LLC, 44W320 Keslinger Road, Elburn, IL 60119, and the Tendo flow meter available from *Tendo* Technologies, Inc., 303A College Rd E, Princeton, NJ 08540, as well as others such as described in or employing any of U.S. Pat. Nos. 11,187,715, 11,054,290, 10,539,443, or U.S. Pub. Pat. Appl'n Nos. 2020/0233006, 2018/0252559, or 2018/0058889 each of which is incorporated herein by reference in their entirety.

Once sufficient material has entered the vessel 202, mixing would be able to begin by flowing out of the vessel 202. Material flowing out of the vessel 202 for batching enters a mixer 214, for example, an in-line high shear mixer. One representative example of an appropriate mixer 214 is the Quadro Comil or Ytron ZC available from Quadro Engineering Corp., 613 Colby Drive, Waterloo, ON, N2V 1A1, Canada. Other appropriate mixers can include, depending upon the materials to be mixed, those available from Silverson Machines, Inc., 355 Chestnut St., East Longmeadow, MA 01028, or Charles Ross & Son Co., 710 Old Willets Path, Hauppauge, New York 11788, or INOXPA USA, Inc., 1000 Jupiter Road, Suite 300, Plano, TX 75074.

The pump 216 is, ideally, a single, highly efficient pump designed for easy cleaning and air-drying in place. The pump's primary role is to providing adequate suction to charge the vessel 202, enabling the recirculation of materials within the system 200. In addition, the same pump 216 can be used to facilitate transfer of the fully mixed finished product into containers 224. Suitable types of pumps can include positive displacement pumps or centrifugal pumps sized and powered to be able to sufficiently circulate the most viscous ultimate mixture contemplated through the mixing circuit.

Control of the pump 216 can be managed through a conventional Variable Frequency Drive (VFD), which allows precise adjustment of the speed and torque of the pump 216 to match the specific needs of each batch being mixed. The VFD not only allows for optimizing pump 216 performance, in some variant systems, it can also be used to feed real-time operational data, such as torque and speed metrics, back to an AI system 250 (if present). Such a feedback loop can allow the AI system 250 to monitor and adjust the process dynamically, ensuring efficient and consistent operation throughout the production cycle.

The optical sensor 218 is used to analyze the batch as it is being mixed in order to know, in real time, if and when the batch is homogenous and fully mixed. The optical sensor 218 is selected as one that can quickly analyze a sample of the material being batched as it flows past the optical sensor 218.

Depending upon the particular implementation variant, the optical sensor 218 can be a spectrometer providing near infrared (NIR) spectroscopy, such as units available from Bruker Corp., 40 Manning Rd, Billerica, Massachusetts 01821 or using Raman spectroscopy such as, for example, a Raman Rxn5 Process Analyzer available from Endress+Hauser USA, 2350 Endress Place, Greenwood, IN 46143. Alternatively, the optical sensor can be an in-line refractometer such as shown and described in U.S. Pat. No. 8,040,499 or the FLEXIM PIOX® R721 inline process refractometer available from FLEXIM Flexible Industriemeßtechnik GmbH, Boxberger Str. 4, Berlin, Germany D-12681.

In the case of a spectrometer as the optical sensor 218, the optical sensor 218 is used to identify specific molecular compositions and concentrations and return various readings about its make-up, and in some variant implementations, the viscosity of the sample. Alternatively, depending upon the particular implementation a viscometer/viscosimeter can be used to separately with a spectrometer to determine the viscosity.

More particularly, when the optical sensor 218 is a spectrometer it operates by measuring the spectrum of light absorbed or emitted by the mixture in the batch being processed. The data readings act as a chemical fingerprint that reflects the composition and quality of the batch being mixed. Throughout the batching process, the spectrometer 218 will continuously (or periodically) monitor the spectra and those spectra may either be (i) compared against the expected spectrum of the final, fully mixed, product or (ii) used to determine when the spectra for the product has reached a steady state. Deviations in the spectra (from an expected spectrum or ongoing, reflecting a lack of a steady state) indicate potential variations in composition or mixing uniformity. Accordingly, through this real-time analysis, it is possible to know when a batch is properly mixed, i.e., when the mixture's spectrum matches that of the desired final, fully mixed, product or the spectra reaches a steady state. Depending upon the particular implementation variant, this can merely be programmatically performed under computer control or can involve the use of the AI system, 250 to learn when a batch is fully mixed.

When the optical sensor 218 is a refractometer, it operates by measuring the refractive index of the batch being mixed. Similar to the spectrometer, throughout the batching process, the refractometer will continuously (or periodically) measure the refractive index until the readings reach a steady state, at which point the batch is fuilly mixed.

Depending upon the particular implementation, it is contemplated that other types of optical sensors can be used as the optical sensor 218 referred to herein.

The manual input station 220 allows for adding any materials for a batch that are not housed in the mezzanine 204. The manual input station 220 is generally made up of a large funnel into which materials, such as powders, crystals, and liquids can be poured, and is either connected to the piping between the vessel 202 and the mixer 214 or is connected by piping directly to the mixer 214 input. In some implementations there can be a valve, for example, a 3-way automated valve, that may be connected to, for example, a manual addition line with a lance to pull raw materials from drums. To control how much material is dispensed, the drum can, for example, be placed on a floor scale.

The dispensing unit 222 is used for "pack out" of the fully mixed material into appropriate containers, e.g., drums, barrels, jerry cans, crates, bottles, etc.

Some dispensing unit 222 variants will use an articulated arm 228 at an output part of the piping for the system 200. To fill a package container 224, the nozzle 234 on the end of the articulated arm 228 will be positioned by an operator into a package container 224 and locked in place so that it doesn't move while the package container 224 is being filled. As noted above, in many implementation variants, the package container 224 will be placed on a floor scale during filling, so the operator or system 200 knows how much material has been dispensed and when to stop filling, at which point, the nozzle 234 can be moved to the next package container 224 (if any). When a pour is complete, as is conventionally done, the operator can close (e;g., cap or seal) the containers 224 so they can be shipped.

Still other dispensing unit 222 variants will use an articulated arm 228 controlled by a collaborative robot, or, in some variants, a fully robotic arm, to perform the positioning of the nozzle 234 as above. Such variants may be pre-programmed to have the coordinates of exactly where the container inputs are (or optionally make use of machine vision to identify the container inputs) and programmatically move from input to input until all the containers 224 have been filled. As with a conventional manual dispensing unit 222, the containers can be placed on a floor scale, so an operator or the system knows how much material has been dispensed and when to stop or a setpoint is reached that causes the system to stop.

Optionally, machine learning algorithms can be employed to tune transfer and, with some variants, automate a valve, associated with the nozzle 234 or piping, to fill to target weights with increased accuracy.

With some of these variants, when a pour is complete, another co-bot can be used to close (e.g., cap or seal) the containers so they can be shipped.

Still further dispensing unit 222 variants can be fully automated and would use a combination of machine learning, a robotic arm 228 and machine vision to conduct the pours. For example, a 3d camera or pair of cameras 230, coupled to the computer running the machine vision programming can be used to identify the type of package container 224 and the location of its input and position the nozzle 234 into the input of the package container 224, determine when the package container 224 is filled and move on to the next package container 224 (if any) and repeat. Likewise, variants of these dispensing unit variants 222 can use similar technology (and potentially an additional robotic arm or cobot) to locate and close the package container 224.

As alluded-to above, variants of the system 200 may include a clean in place subsystem.

Figure 3:
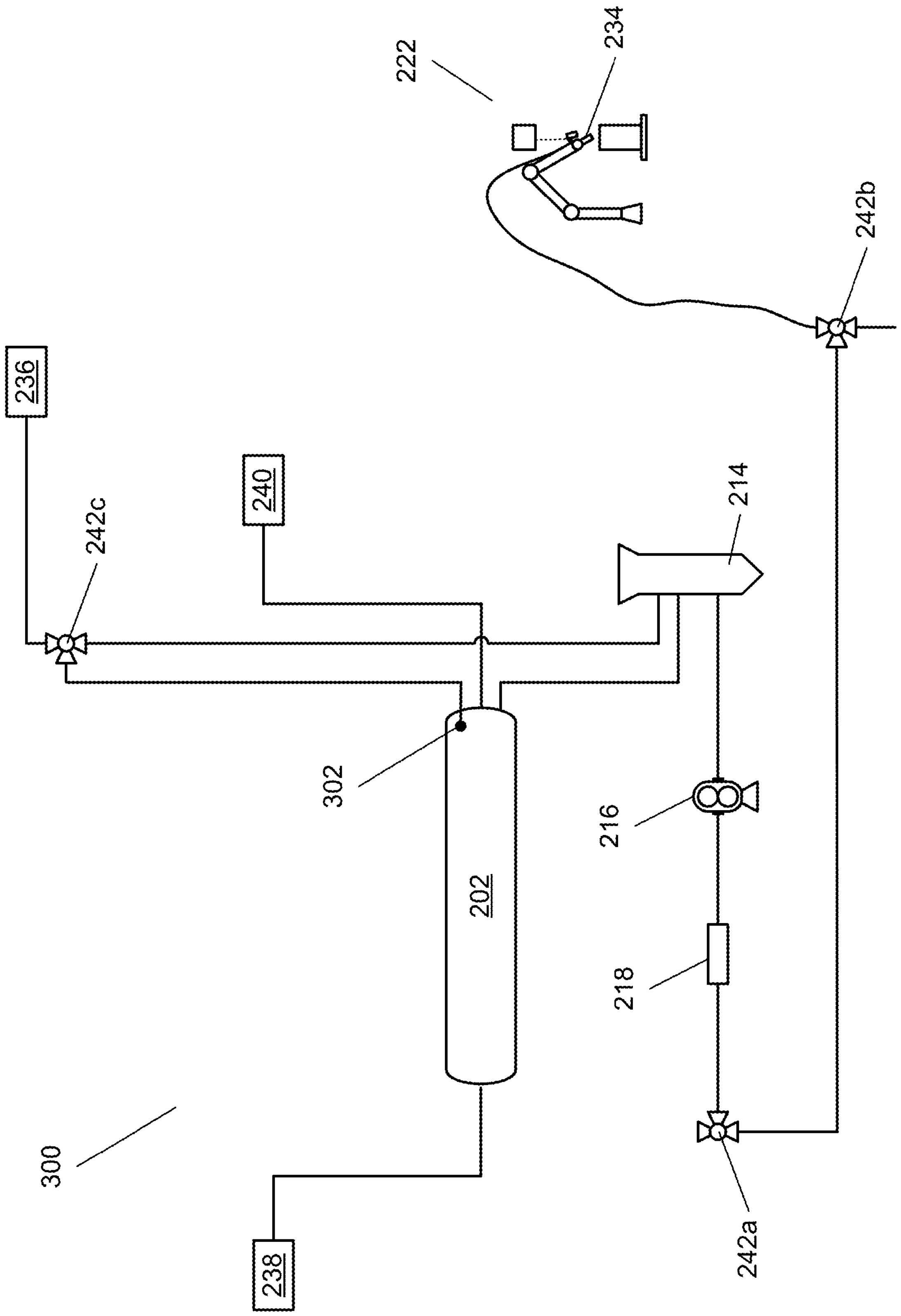
FIG. 3 illustrates, in simplified form, the components of the system of FIG. 2 that are involved in the clean-in-place subsystem.

FIG. 3 illustrates, in simplified form, the components of the system 200 of FIG. 2 that are involved in the clean-in-place subsystem 300.

The clean-in-place subsystem 300 introduces a cleaning fluid (e.g., an appropriate surfactant, hot water, etc.) via the clean-in-place supply 236. From there, the cleaning fluid is directed, via a valve 240*c* to the vessel 202 and, more particularly, one or more spray devices 302 within the vessel 202. The one or more spray devices 302 are used to spray the cleaning fluid onto every surface within the vessel. Depending upon he particular implementation variant, the one or more spray devices 302 could be a one or more spray balls or jet spray devices attached to an articulated arm that would move at least a portion of the length of the vessel 202 while spraying the cleaning fluid, or it could involve multiple spray balls mounted at strategic fixed locations within the vessel 202. Suitable spray balls and/or jet spray devices are available from Sani-Matic, Inc., 2855 Innovation Way, Sun Prairie, WI 53590.

The cleaning fluid is then circulated through the mixer 214, pump 216, optical sensor 218 to, and out of, the nozzle 234. Optionally, or additionally, the clean-in-place subsystem, 300 can include at least one additional valve 242*b* before the nozzle 234 to ensure that, once the nozzle 234 has been cleaned, there is proper drainage of all of the cleaning fluid. Also optionally, if a drum lance is used then a valve (not shown) connecting the lance to the main pipe system may need to be present so the lance can get cleaned as well.

In addition, as noted above, the clean-in-place subsystem 300 may also include a drying air source 238 and associated piping through which hot or dry air can be introduced into the subsystem 300, once the cleaning fluid has all drained, to make sure that all of the cleaning fluid is actually gone and the interior of the components and piping is completely dry, thereby avoiding contamination of the next batch to be mixed. In use, the valves will be set so that air introduced via the drying air source 238 will exit the nozzle 234 the exhaust 240 and, if present, the lance.

As mentioned above, systems incorporating the teachings herein can include an AI system 250. In overview, integrating an AI system 250 into the process advantageously provides an advancement in quality control (QC) because it can potentially eliminate the need for traditional QC testing by analyzing comprehensive data collected throughout the manufacturing process. The AI system 250 would use key data inputs, for example, the exact quantities of materials poured, results from spectrometry analyses, and detailed records of every step in the dispensing of raw materials. Additionally, the AI system 250 could also consider material data for each raw material used in the batch, thereby creating a comprehensive dataset for analysis. This extensive data collection would enable the AI system 250 to assess and predict the likelihood of a batch passing QC.

The training process for the AI system 250 would involve the AI system 250 being fed the relevant array of data and other information that would normally be used for QC, and would analyze that data and information to predict the QC outcomes. In addition, traditional QC testing would concurrently be done alongside AI predictions. The results of (or deviation from the results from) the traditional QC testing would then be fed back into the AI system 250 to enable it to learn and refine its predictive algorithms. Through this iterative learning process the AI system 250 can improve its accuracy over time, and thereby make more precise predictions with each successive batch. By correlating specific manufacturing variables with QC results, the AI system 250 can advantageously become increasingly adept at identifying potential issues before they actually manifest in the final product, thus enhancing the overall efficiency and reliability of the manufacturing process.

Moreover, some AI system 250 variants can be configured to track and analyze yield loss data, thereby providing another layer of predictive capability. By understanding the factors that contribute to yield loss, such AI system 250 variants will learn to forecast future yield outcomes and suggest adjustments to optimize production efficiency. Through a dual focus on QC and yield loss prediction it can be possible to not only maintain high product quality, but also advantageously minimize waste and maximize resource utilization.

Thus, it should be appreciated that the incorporation of an AI system 250 may provide the ability to phase out some or all of the traditional QC testing, thereby transforming QC from a reactive to a predictive process. Such an approach can streamline operations, significantly reduce costs and improve overall productivity.

In general, as briefly mentioned above, the AI system 250 is connected to the ERP/MES system 255 to, in concert, manage and coordinate the relevant business processes and information flow within the organization relating to an order for a product that is to be batched as described herein. In overview, when an order for a particular batch is received, the ERP/MES system 255 processes and forwards this order information to the AI system 250. The order information will typically include details such as the type and quantity of product to be manufactured, delivery deadlines, and any specific client requirements.

As the manufacturing process begins, the AI system 250 continuously monitors and records the consumption of raw materials in real time. The precise amounts of each raw material used (from the mezzanine 204 and/or via the manual input station 220) are tracked and logged. This real-time data can then be sent back to the ERP/MES system 255 to update inventory levels accordingly. In this manner the ERP/MES system 255 has an ongoing, up-to-date, view of raw material usage, allowing for better inventory management and reducing the risk of running out of stock of any particular material(s) or over stocking of materials(s). Advantageously, through this dynamic feedback loop between the AI system 250 and ERP/MES system 255, optimal inventory levels can be maintained, supporting just-in-time manufacturing practices.

In addition, for some implementation variants, when a production batch is complete, one or more controllers can manage the process where the final products are packaged for delivery. During this stage, the one or more controllers will be aware of the tare weights of the containers 224 to be filled and can record both the actual weight (precise measurement of the product within each package container 224) and the theoretical (i.e., client-facing) weight (the expected weight based on predefined standards and specifications) of each package container 224. This data ensures that each package container 224 meets quality standards and client expectations.

Once the packaging process is complete, the one or more controllers can post information relating thereto back to the ERP/MES system 255 by providing, for example, details such as the number of containers produced, their respective weights, and any discrepancies between actual and theoretical weights. Advantageously, by updating the ERP/MES system 255 in real time, an organization can gain prompt visibility into production outcomes, enabling quick decision-making and efficient management of the supply chain. Such integration can further ensure that all stakeholders, including clients, have access to accurate and timely information about the order(s), thereby enhancing transparency and customer satisfaction.

Additional controls for the system 200 can be provided using one or more conventional computer(s) programmed to operate in accordance with the teachings herein or more special purpose controllers, for example one or more Programmable Logic Controllers (PLC), which are a type of known industrial-grade computer used for automating and controlling machinery and processes. Variants that use PLCs can have advantages over variants employing the one or more computers because PLCs are highly reliable and capable of handling complex tasks, in many instances, making them better suited for managing the intricate operations described herein. Specifically, PLCs can offer real-time monitoring and control, ensuring precise management of the processes described herein, including, for example, the regulation of the pump, monitoring of critical control points, and enforcement of Hazard Analysis and Critical Control Points (HACCP) protocols. HACCP is a systematic preventive approach to food safety that identifies, evaluates, and controls hazards that could pose a risk to the safety of food products.

In addition to one or more PLCs, the system 200 may also optionally incorporate IO-Link, which is a standardized communication protocol that allows for the seamless integration of sensors and actuators into a control system. IO-Link can enhance the system's 200 capabilities by enabling bidirectional communication between a PLC and field devices, such as the pump, optical sensor, valves, etc., to provide real-time data exchange and obtain diagnostic information. Thus, incorporation of IO-Link can help improve the accuracy and efficiency of the controls of the system 200, enabling the system 200 to gather detailed information from various sensors around the system 200 and, directly or with the AI system 250, adjust operations dynamically based on the information received.

The inclusion of IO-Link also can provide various benefits such as simplifying wiring and installation, reducing setup time, providing for easier maintenance and troubleshooting, because it can enable the system 200 to quickly identify issues with connected devices. Thus, variants that incorporate a PLC-based control system and IO-Link, can more readily achieve a manufacturing process that is more efficient, reliable, and flexible that current systems and approaches, while adding the ability to easily adapt to changing conditions and requirements not currently available with current systems and approaches.

Still further, systems 200 incorporating the teachings herein can further be augmented to integrate HACCP protocols directly into their operations, rather than treating them as separate, external documents. Variants that embed HACCP into the system 200 can ensure that specific safety measures are automatically enforced throughout the process. As a result, critical control points where potential hazards could occur, are continuously monitored and managed by the system 200. For example, by embedding HACCP, adherence can be tracked, and deviations from the safety standards can trigger immediate corrective actions. In general, the HACCP integration can be part of the system 200 to maintain compliance with HACCP standards.

Additionally, this approach can advantageously also streamline compliance and documentation requirements because, instead of maintaining separate HACCP records, all safety-related data and actions would be recorded and stored within the system itself. Such an approach simplifies regulatory compliance and can enhance traceability and accountability by helping to ensure that every batch produced adheres to the appropriate safety standards, protecting both consumers and the integrity of the manufacturing process.

Figure 4A:
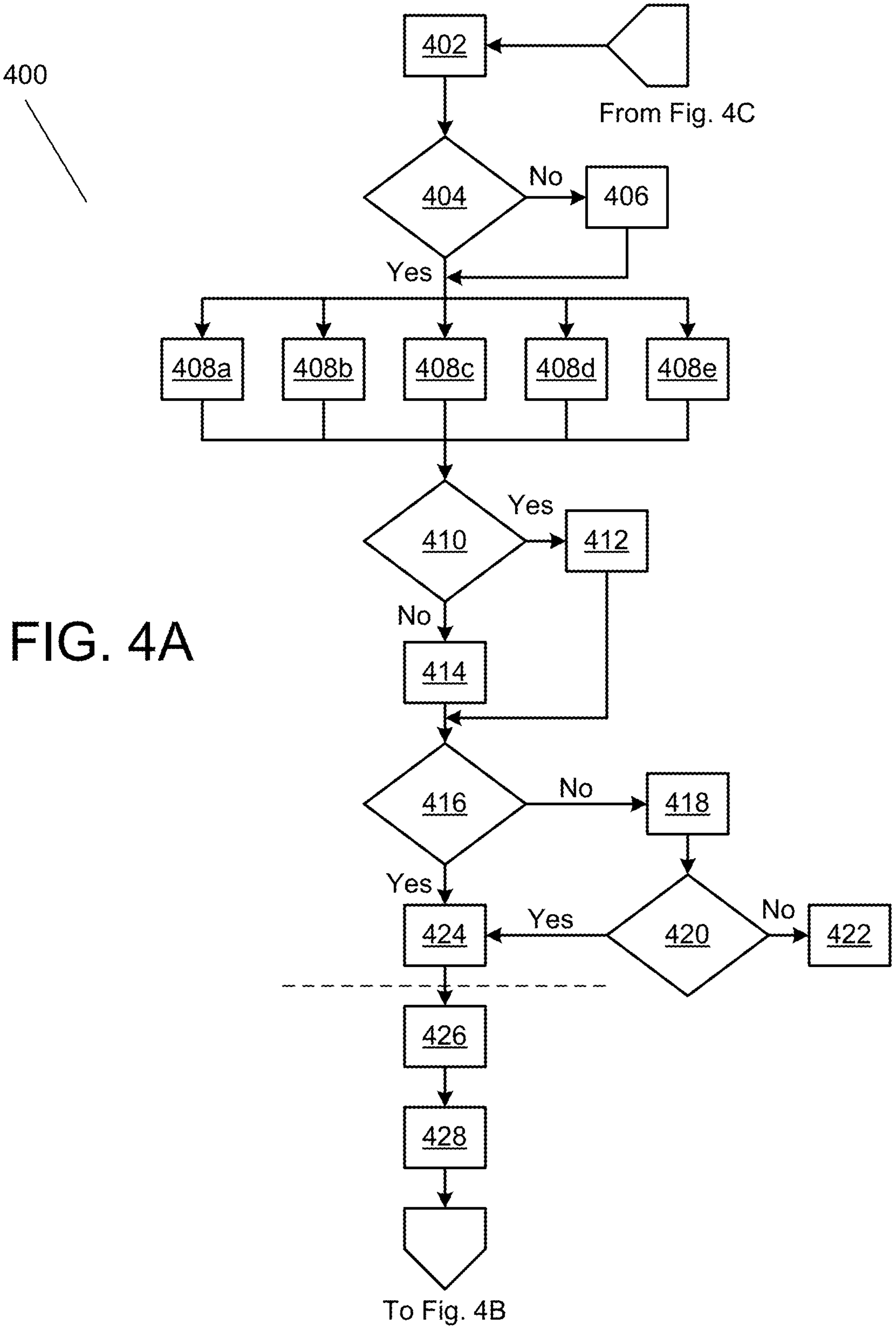
Figure 4B:
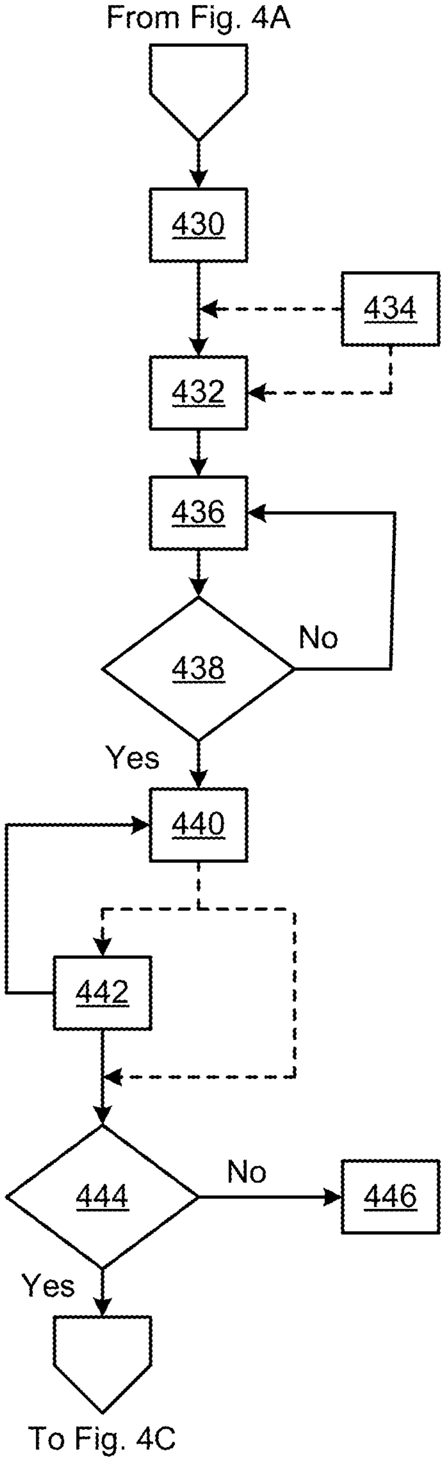

FIGS. 4A-4C, collectively, is a flowchart illustrating, in simplified form, the overall process 400 from initial order receipt through packaging for shipment/delivery in accordance with the teachings herein.

The process 400 advantageously is computerized and begins with entry of an order into the ERP/MES system 255 (Step 402).

First, a determination is then made as to whether the order is already split up into the various parts of the batch that are needed (Step 404). If the order has not been split up, the order is sent to a scheduling tool (Step 406) for splitting into its various parts, based upon, for example, quantities, component properties, component characteristics, special handling needs, etc. If the order is already split, the process 400 proceeds to the performance of those parts, e.g., small pour preparation (Step 408*a*), powder kitting (Step 408*b*), manual pour preparation (Step 408*c*), retrieval of drum(s) from storage (Step 408*d*), and other appropriate process parts to be used for creating the batch (Step 408*e*). Note here that, as a general matter, Steps 408*a*-408*e* are conventional known processes performed in the batching field and so they are not detailed herein. In addition, and unlike with the conventional processes, the determination step will also ascertain which components would be added via the piping from the mezzanine 204 to the vessel 202 versus which will be added via the manual input station 220.

Next, the process involves determining whether the scheduling tool will specify the batch sequence or if it is to be specified by an operator (i.e., manually) (Step 410). If the scheduling tool determines the sequence, it does so (Step 412), otherwise, it is done manually by an operator (Step 414).

Then, an inventory check is performed on the required components from the mezzanine 204 to determine if there is a sufficient inventory of each component that will be added to the vessel 202 in preparing the batch (Step 416). As noted above, this may involve the system 200 alone, the ERP/MES system 255 alone, or some combination thereof, depending upon the particular implementation variant.

If there is an absence or shortage of material, a determination is made as to whether or not another material can be substituted (Step 420). If a substitution is not possible, the order is put on hold and the process 400 stops (Step 422). If the inventory is sufficient, the process continues.

At this point it should be understood and appreciated that, for some variants, the foregoing steps can be performed as conventionally currently done (i.e., without employing the teachings herein), in contrast to the following steps that are advantageously unconventional, new and provide significant advantages over current systems and approaches.

Turning back to FIG. 4A, the process 400 continues with the initiation of any HACCP protocols as addressed above that will be performed by the system 200 (Step 426).

Next, the start of the batching operation is initiated (Step 428), which, in some variants, may be triggered automatically by the system 200 and, in some variants, by a human operator, for example, by pressing a button or making a selection on a computer console.

As a result, the appropriate amounts of materials from containers 206 in the mezzanine 204 are metered into the vessel 202 via the respective piping, valves 208, 212 and mass flow meters 210 (Step 430 (FIG. 4B)).

Then, the pump 216 begins causing the re-circulating of material between the vessel 202 and mixer 214 (Step 432). Moreover, concurrent with, prior to Step 432, the manual input station 220 materials, if any, are also added (Step 434).

While re-circulating is occurring, spectroscopy and viscosity sensor readings of the circulating material are taken (Step 436) to determine whether mixing is complete. Based upon those readings, the process 400 determines whether mixing is complete. If not, the circulation of the materials through the vessel 202 and mixer 214 and taking of readings continues. If so, the AI system 250 will use stored manufacturing data, the readings and QC information to make a prediction as to whether the batch will pass QC (Step 440).

During the AI system 250 training phase, a sample of the batch would undergo QC testing (Step 442), with a result of the QC testing being fed back to the AI system 250 for training. Once AI training is complete to an appropriate level of confidence, the AI system 250 prediction will be used in place of QC testing.

If the QC testing of the batch during the training phase does not pass or the AI system 250 prediction determines that the batch will not pass QC (Step 444), the process ends (Step 446).

If the QC testing passes of the batch during the training phase or, post training phase, the AI system 250 prediction determines that the batch will pass, the process 400 will proceed to the packaging phase (FIG. 4C).

As shown, depending upon the particular implementation variant, the packaging aspect of the process 400 for a given batch can be entirely manual (i.e., using conventional the packaging approach) with a human operator placing the nozzle 234 of an articulated arm into a package container 224 resting on a scale 226 and filling the package container 224 until filled to the appropriate amount (Step 450) followed by manually capping the package container 224 (Step 452).

Alternatively, with other variants, the packaging aspect for a given batch can be automatic, with either a co-bot placing the nozzle 234 according to pre-specified programming or, if a robot arm and machine vision is used, the robot arm locating the proper input location for the container and filling the package container 224 until filled to the appropriate amount (Step 454) and then either another co-bot or the robotic arm capping the package container 224 (Step 456).

With still other variants, where, for some reason, certain batches may need to be packaged manually, whereas others can be done automatically, the process 400 can determine, based upon input from an operator, or the system 200 and/or ERP/MES system 255, which approach is to be used for the specific batch (Step 448) and the determined packaging is used.

Either during, or following, packaging, information relating to the successfully completed batch can be sent back to the ERP/MES system 255 (Step 458).

FIG. 5 is a flowchart for the of clean-in-place process 500.

The process begins, following completion of packaging of a batch, in the case of manual triggering, by an operator initiating the process by pressing a button or making a selection in a computer program to invoke the clean-in-place subsystem 300.

First, the subsystem 300 introduces a cleaning fluid into the system 200 via the clean-in-place supply 236 (Step 502) where it is directed, via a valve 240*c* to the one or more spray balls 302 within the vessel 202 where the one or more spray balls 302 spray the cleaning fluid onto every surface within the vessel 202. next, the pump 216 is turned on to circulate the cleaning fluid through the mixer 214, pump 216, optical sensor 218 for some period of time (Step 504). Then the cleaning fluid is directed out of, the nozzle 234, and, in some variants, some of the cleaning fluid is directed out any other outlets (e.g., the sampling valve 244) (Step 506). Also optionally, if a drum lance was used then, at some point, the valve connecting the lance to the main pipe system will be opened so the cleaning fluid can clean the lance as well.

In addition, as noted above, the clean-in-place subsystem 300 may also include a drying air source 238 through which hot or dry air can be introduced into the subsystem 300, once the cleaning fluid has all drained, to make sure that all of the cleaning fluid is actually gone and the interior of the components and piping is completely dry, thereby avoiding contamination of the next batch to be mixed. In use, the valves will be set so that air introduced via the drying air source 238 will exit the nozzle 234 the exhaust 240 and, if present, the lance.

Once all of the cleaning fluid has exited the system 200, drying air is introduced into the system 200 (Step 508) via the drying air source 238 (under pressure, via one or more fans, etc.) and valves are opened (Step 510) so that the drying air can reach all of the various components that were cleaned by the cleaning fluid and exit from, for example, the nozzle 234 and exhaust 240.

Depending upon the particular implementation variant, the system 200 may include additional sensors to detect that the components and piping of the system 200 are completely dry. Since the detection of the presence or absence of moisture is well known, for simplicity, such sensors are not shown and may or may not be present in any particular variant. However, if present, the sensors can be used to determine whether the components are dry (Step 512) and signal, for example, a PLC, and if not, to continue (Step 508) or end (Step 512) the introduction of the drying air.

Figure 6:
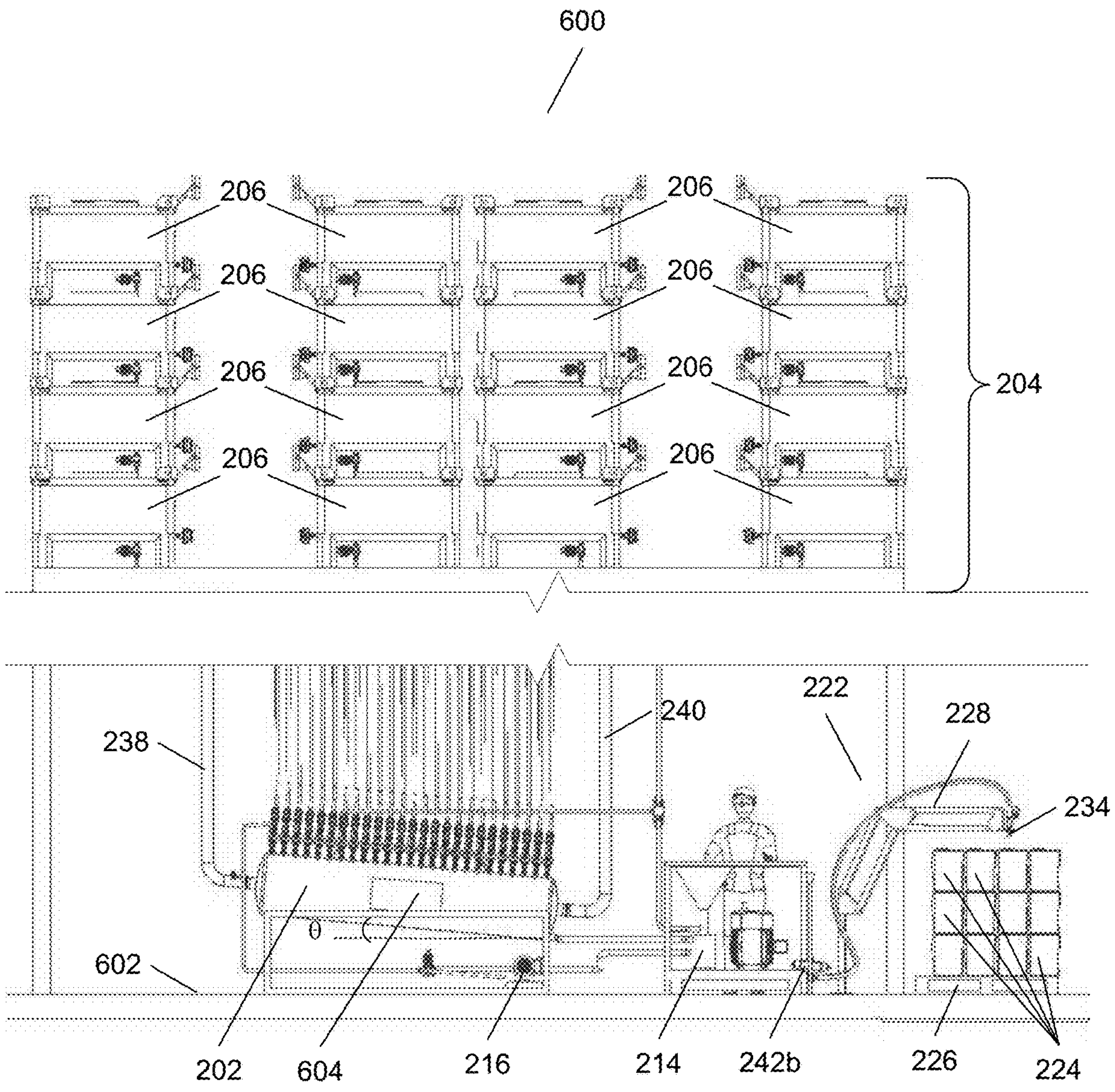
FIG. 6 illustrates, in simplified form, a representation of a portion of a factory implementing a variant according to the teachings herein.

FIG. 6 illustrates, in simplified form, a representation of a portion 600 of a factory implementing a variant according to the teachings herein.

As can be seen in FIG. 6, the vessel 202 is oriented at an angle (i.e., tilted) relative to the floor 602 on which the vessel 202 rests at an angle theta (0). In addition, this vessel 202 has an access port 604 in the side of the vessel 202. Moreover, the vessel 202, manual input station 220, mixer 214, pump 216 and dispensing unit 222 are all substantially longitudinally aligned so as to take up a minimum amount of space.

Figure 7:
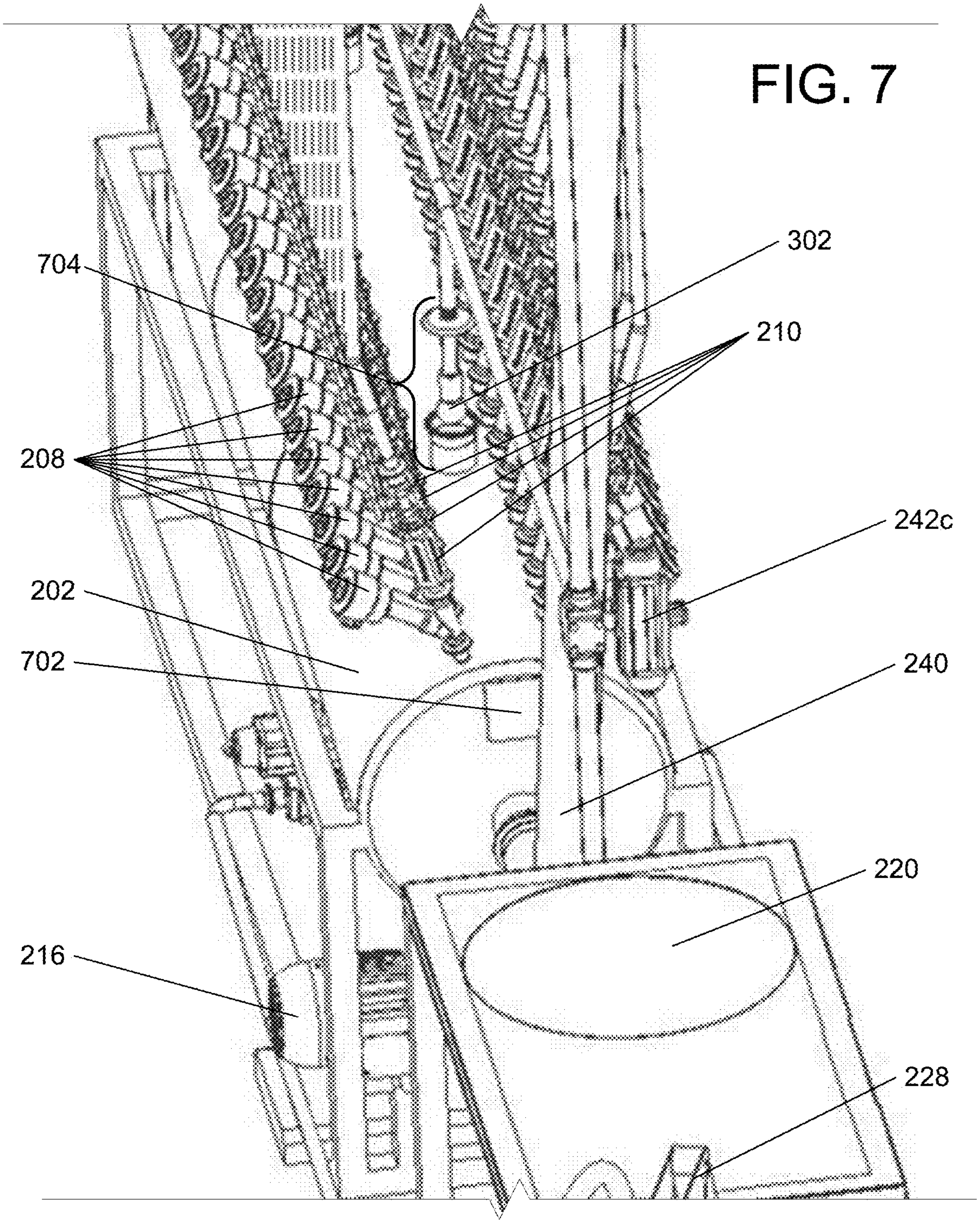
FIG. 7 illustrates, in simplified form, an enlarged top perspective view of part of the variant of FIG. 6.

FIG. 7 illustrates, in simplified form, an enlarged top perspective view of part of the variant of FIG. 6.

As can be seen in FIG. 7, this variant includes at least fifty individual valves 208 and a mass flow meters 210 in the piping path leading from the containers of the mezzanine to the vessel 202. This variant also includes an additional access port 702 in an end of the vessel 202. In addition, a part 704 of the clean in place subsystem is shown with a spray device 302 removed from inside the vessel 202 (so it can be seen). In addition, this view further shows the substantially longitudinally alignment discussed in connection with FIG. 6.

Figure 8:
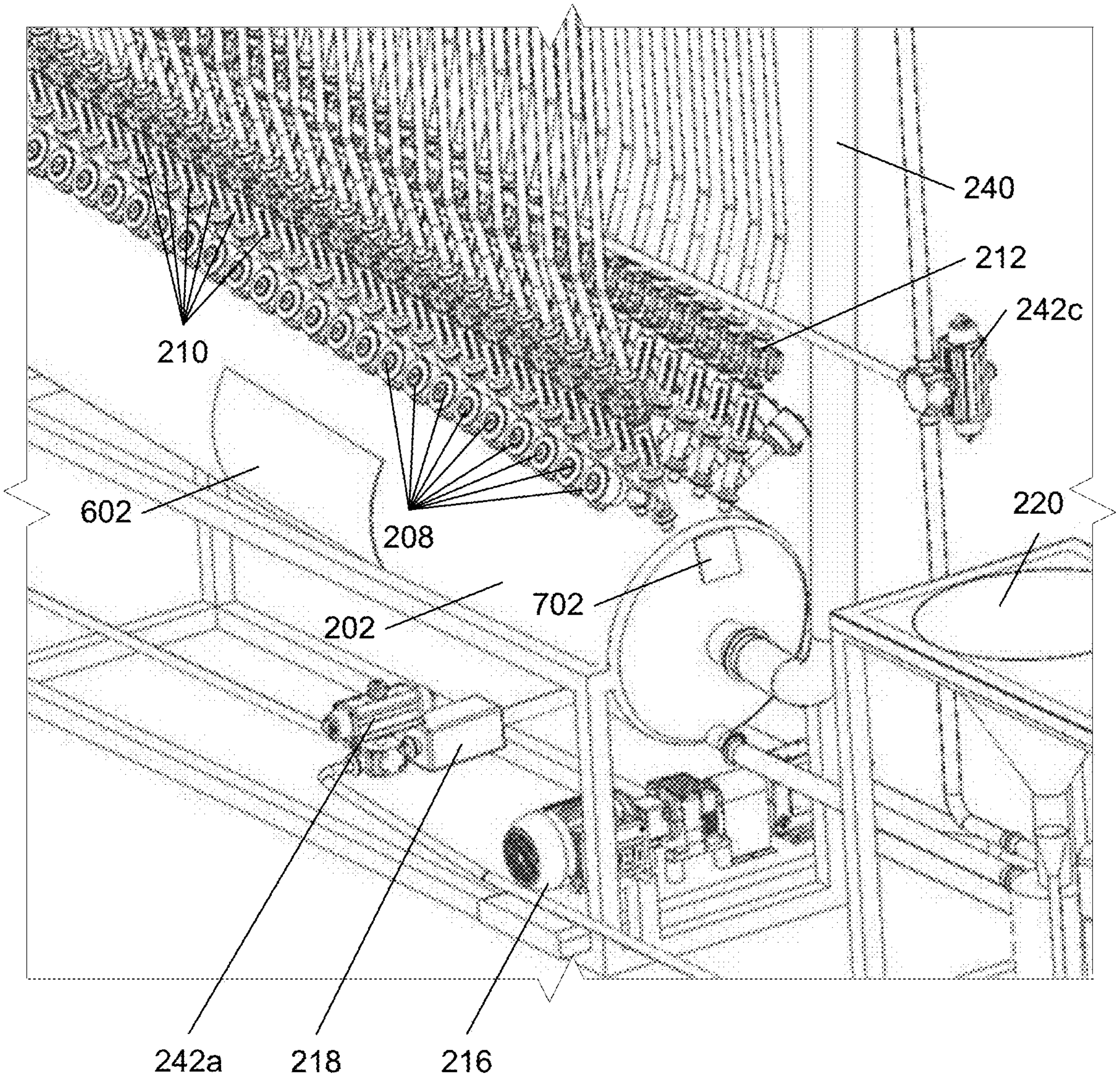
FIG. 8 illustrates, in simplified form, an enlarged somewhat side perspective view of another part of the variant of FIG. 6 to provide an alternative view of some of the components of FIG. 6.

FIG. 8 illustrates, in simplified form, an enlarged somewhat side perspective view of another part of the variant of FIG. 6 to provide an alternative view of some of the components of FIG. 6.

Figure 9:
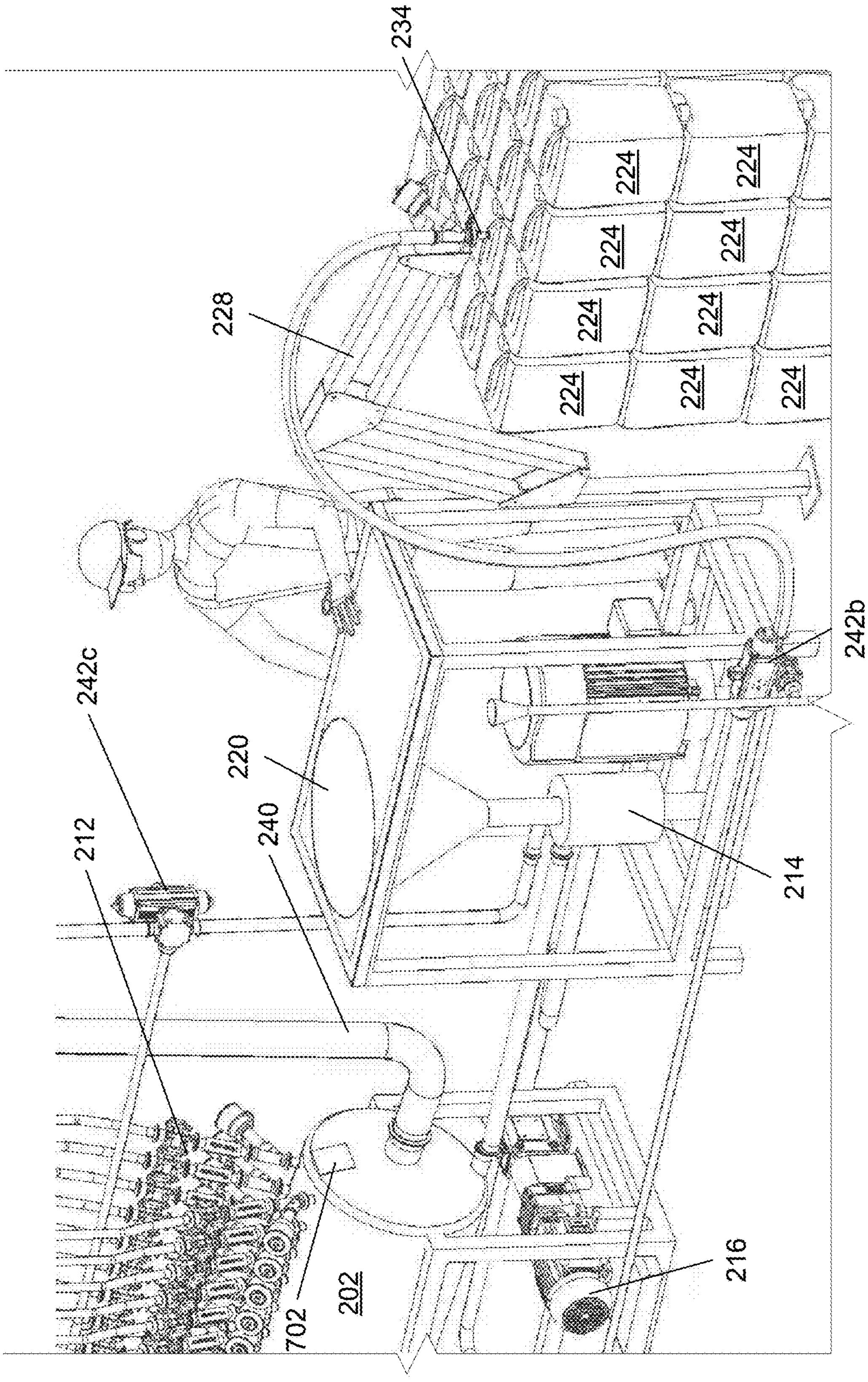
FIG. 9 illustrates, in simplified form, an enlarged somewhat side perspective view of a further part of the variant of FIG. 6 to provide an alternative view of some of the components of FIG. 6.

FIG. 9 illustrates, in simplified form, an enlarged somewhat side perspective view of a further part of the variant of FIG. 6 to provide an alternative view of some of the components of FIG. 6.

Figure 10:
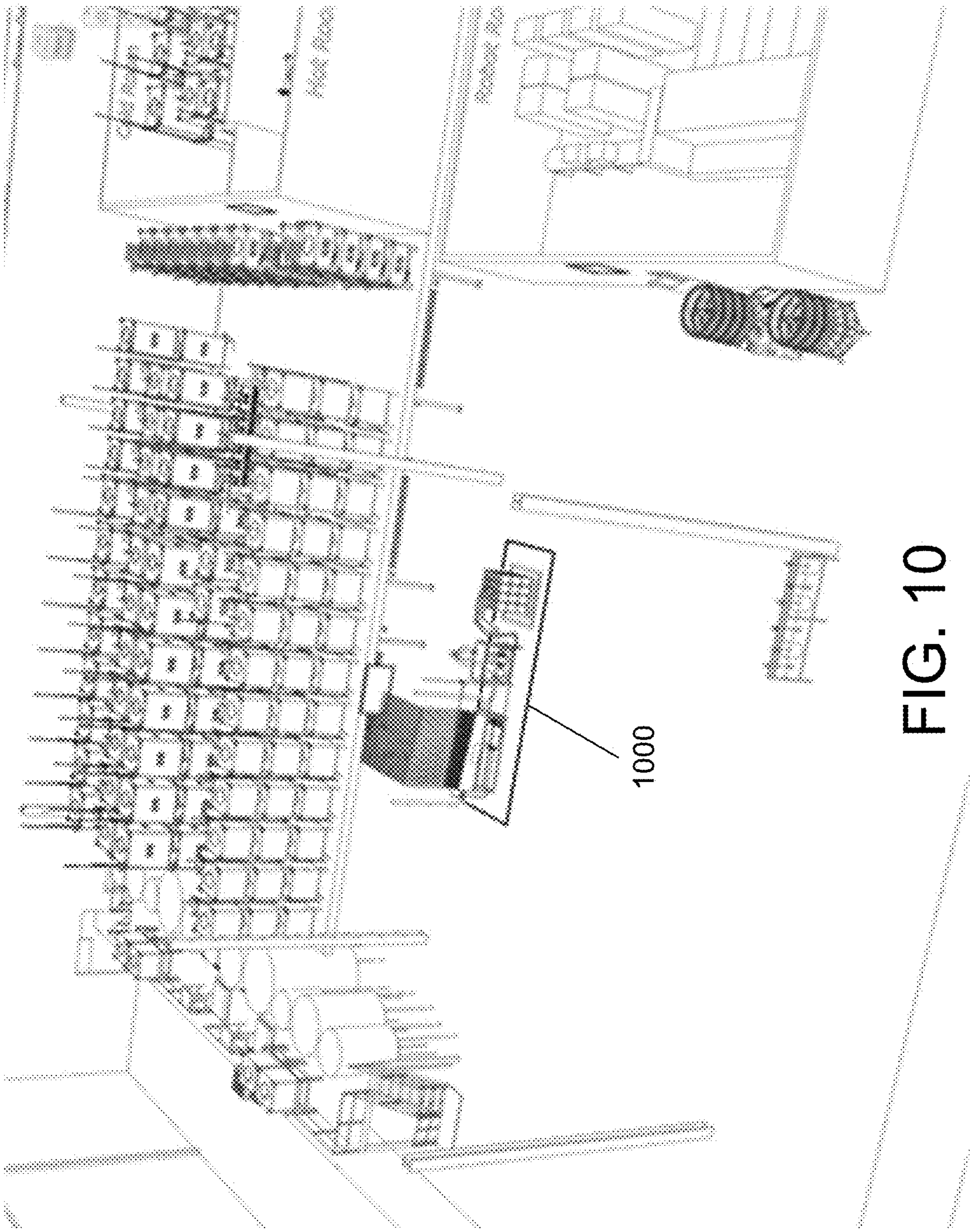
FIG. 10 illustrates, in simplified form, an example of part of a factory having portions containing the equipment, used in the flavors and fragrances industry, to batch dozens of, to hundreds of, or more, raw materials together, according to one variant in accordance with the teachings herein.

FIG. 10 illustrates, in simplified form, an example of part of a factory having portions containing the equipment, used in the flavors and fragrances industry, to batch an equivalent number (or more) raw of materials together to that of FIG. 1, but configured with a variant in accordance with the teachings herein.

As can be seen in FIG. 10, by comparison, and in distinct contrast to FIG. 1, the total floor space taken up by the portion 1000 needed to perform the same batching tasks in essentially the same factory is roughly 23 sq. meters (247.5 sq. ft.). As such, enormous savings in cost and time can be realized. Still further, through using the teachings herein, replicated variants can be placed in a common factory, enabling concurrent the processing of batches that would be impossible with the factory of FIG. 1.

Still further, it should now be apparent that batching systems and methods employing the teachings herein significantly reduce the amount of movement required in conventional factories, again, saving time, and reducing the prospect of errors and/or waste.

The foregoing outlines, generally, the features and technical advantages of one or more implementations that can be constructed based upon the teachings in this disclosure in order that the following detailed description may be better understood. However, the advantages and features described herein are only a few of the many advantages and features available from representative examples of possible variant implementations and are presented only to assist in understanding. It should be understood that they are not to be considered limitations on the invention as defined by the appended claims, or limitations on equivalents to the claims. For instance, some of the advantages or aspects of different variants are mutually contradictory, in that they cannot be simultaneously present in a single embodiment. Similarly, some features or advantages may be applicable to one aspect and inapplicable to others. Thus, the foregoing features and advantages should not be considered dispositive in determining equivalence. Additional features and advantages, although not detailed herein, will be apparent from the teachings of the description, drawings, and claims.

What is claimed is:

1. A batching system comprising:
a vessel;
an in-line, high shear, mixer;
a pump; and
an optical sensor;
wherein the vessel, the mixer, the pump and the optical sensor are coupled together by piping so as to form a sequential loop circuit within which materials will re-circulate while being mixed as the materials circulate through the loop and repeatedly pass through the mixer until at least one reading of the material repeatedly passing by the optical sensor indicates that the circulating materials are fully mixed;
a dispensing unit including at least one articulated arm;
a camera; and
a computer, implementing machine vision, configured to automatically detect an opening in a container to be filled by the dispensing unit and orient a nozzle relative to the opening.

2. The batching system of claim 1 further comprising multiple pipes each coupling a container to the vessel via a mass flow meter and an automated valve controlled by the mass flow meter.

3. The batching system of claim 1 further comprising, a manual input station coupled to one of the mixer or piping.

4. The batching system of claim 1, wherein the optical sensor implements near infrared spectroscopy.

5. The batching system of claim 1, wherein the optical sensor implements Raman spectroscopy.

6. The batching system of claim 1, wherein the optical sensor is a refractometer.

7. The batching system of claim 1, wherein the articulated arm is a robotic arm.

8. The batching system of claim 1 further comprising, a clean in place subsystem.

9. The batching system of claim 8, wherein the clean in place subsystem includes at least one spray device within the vessel.

10. The batching system of claim 8, wherein the clean in place subsystem includes a drying air source.

11. The batching system of claim 1, wherein the at least one articulated arm is coupled to the sequential loop circuit.

12. The batching system of claim 11, wherein the at least one articulated arm is a robotic arm.

13. The batching system of claim 1, wherein
the vessel has a longitudinal axis, and
the longitudinal axis is oriented at an acute angle relative to a floor on which the vessel rests.

14. The batching system of claim 1 further comprising a manual input station, and wherein the vessel, the manual input station and the dispensing unit are substantially longitudinally aligned.

15. The batching system of claim 1 further comprising, at least 25 pipes, each pipe individually coupling a container to an upper section of the vessel via a mass flow meter.

16. The batching system of claim 1 further comprising, an AI system and an ERP/MES system, wherein the AI system and ERP/MES system interact to control operation of the batching system.

17. A batching method comprising:
introducing into a vessel, multiple materials to be mixed as a batch;
repeatedly circulating the multiple materials in a loop through a circuit formed by a mixer, a pump, an optical sensor and the vessel until a reading by the optical sensor indicates that the multiple materials that have repeatedly circulated through the loop are fully mixed; and
once the multiple materials are fully mixed, dispensing the fully mixed materials into at least one package container using machine vision to guide a nozzle of an articulated arm to an opening of the at least one package container.

18. The batching method of claim 17, further comprising:
detecting, using the optical sensor and an AI system, coupled to the optical sensor, to determine when the circulating multiple materials are fully mixed.

19. The batching method of claim 18, further comprising:
predicting, using at least the AI system, when the circulating multiple materials are fully mixed, whether the fully mixed materials will pass quality control.

* * * * *